United States Patent
Wang

(10) Patent No.: US 7,548,594 B2
(45) Date of Patent: Jun. 16, 2009

(54) ADAPTIVE CHANNEL ESTIMATION METHOD USED IN MULTI-CARRIER COMMUNICATION SYSTEM

(75) Inventor: Cheng-Kang Wang, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 706 days.

(21) Appl. No.: 10/908,634

(22) Filed: May 20, 2005

(65) Prior Publication Data

US 2005/0265466 A1     Dec. 1, 2005

(30) Foreign Application Priority Data

May 25, 2004   (TW) ............... 93114791 A

(51) Int. Cl.
*H04L 27/00* (2006.01)
(52) U.S. Cl. ..................... 375/316; 375/260
(58) Field of Classification Search .......... 375/260, 375/316

See application file for complete search history.

(56) References Cited

U.S. PATENT DOCUMENTS

| | | | |
|---|---|---|---|
| 5,912,876 A | 6/1999 | H'mimy | |
| 6,141,393 A | 10/2000 | Thomas et al. | |
| 6,424,678 B1 * | 7/2002 | Doberstein et al. | 375/260 |
| 6,614,857 B1 | 9/2003 | Buehrer et al. | |
| 6,654,429 B1 | 11/2003 | Li | |
| 2002/0044593 A1 | 4/2002 | Kuo | |
| 2002/0167913 A1 | 11/2002 | Leung | |
| 2003/0128656 A1 | 7/2003 | Scarpa | |
| 2003/0142764 A1 * | 7/2003 | Keevill et al. | 375/341 |
| 2003/0227866 A1 * | 12/2003 | Yamaguchi | 370/208 |
| 2004/0208267 A1 * | 10/2004 | Lee | 375/354 |
| 2005/0147025 A1 * | 7/2005 | Auer | 370/203 |

OTHER PUBLICATIONS

Digital Video Broadcasting; Framing structure, channel coding and modulation for digital terrestrial television, ETSI EN 300 744 v1.4.1, Jan. 2001, pp. 1-49, European Broadcasting Union.
Sinem Coleri et al., A study of channel estimation in OFDM systems, 2002 IEEE, pp. 894-898.
Ferdinand Classen et al., Channel Estimation Units for an OFDM Systemsuitable for Mobile Communication, Germany, Sep. 1995.

* cited by examiner

*Primary Examiner*—Shuwang Liu
*Assistant Examiner*—David Huang
(74) *Attorney, Agent, or Firm*—Winston Hsu

(57) ABSTRACT

An adaptive channel estimation method utilized in a multi-carrier communication system. The communication system transmits a symbol through a plurality of subchannels. The plurality of subchannels includes a plurality of pilot signal subchannels and a plurality of data signal subchannels. The pilot signal subchannels transmit a plurality of pilot signals of the symbol; the data signal subchannels transmit a plurality of data signals of the symbol. The method includes: categorizing each of the subchannels according to the relative position of each of the subchannels with respect to the pilot signal subchannels; determining channel responses of at least one of the pilot signal subchannels; and estimating channel responses of the data signal subchannels based on the channel responses of at least one of the pilot signal subchannels.

15 Claims, 5 Drawing Sheets

ADAPTIVE CHANNEL ESTIMATION METHOD USED IN MULTI-CARRIER COMMUNICATION SYSTEM

BACKGROUND OF INVENTION

1. Field of the Invention

The present invention relates to a channel estimation method, and more particularly, to an adaptive channel estimation method applied in a multicarrier communication system.

2. Description of the Prior Art

In a conventional communication system, the communication band is usually divided into a plurality of subchannels to increase the utilization efficiency of the band. Each of the subchannels corresponds to a specific subcarrier. This kind of communication systems is regarded as "multicarrier communication systems".

In order to correctly perform equalization to the signals received by a receiver in a multicarrier communication system, the receiver has to execute channel estimation for obtaining channel responses. Take the DVB-T (digital video broadcasting-terrestrial) standard for example. A transmitter may transmit signals called symbols including pilot signals that can be identified by a receiver such that the receiver can execute channel estimation to the subchannels having the pilot signals and thereby obtain the corresponding channel responses. Moreover, the receiver can utilize these corresponding channel responses, so as to determine channel responses of the other subchannels through interpolation.

FIG. 1 is a diagram illustrating how pilot signals are allocated in a few symbols according to the DVB-T standard. In this diagram, each horizontal row represents a symbol; each vertical column represents a subchannel. In FIG. 1, the subchannels can be divided into three different types according to the allocated way of pilot signals. A first type of subchannel is the "continual pilot signal subchannel", which is dedicated for transmitting only pilot signals. A second type of subchannel is the "scattered pilot signal subchannel". In each scattered pilot signal subchannel, a pilot signal is transmitted every four symbols, and data signals are transmitted in the other three symbols. A third type of subchannel is "simple data signal subchannel", which is dedicated for transmitting only data signals. Accordingly, pilot signals are allocated in continual pilot signal subchannels and scattered pilot signal subchannels, and data signals are allocated in scattered pilot signal subchannels and simple data signal subchannels. For more information about the DVB-T standard please refer to the following paper: "Digital Video Broadcasting (DVB); Framimg structure, channel coding and modulation for digital terresterial television", ETSI EN 300 744 V1.4.1, European Broadcasting Union (EBU), 2001-01.

In a conventional communication system, the channel estimation process is typically divided into two parts. The first part includes utilizing the pilot signals of two consecutive symbols and thus determining channel responses of continual pilot signal subchannels and scattered pilot signal subchannels through linear interpolation. The second part includes utilizing the channel responses determined in the first part, so as to determine channel responses of simple data signal subchannels through interpolation by using a multi-tap filter with fixed coefficients.

However, during the first part of the channel estimation process, the channel response of the subchannel corresponding to the scattered pilot signal of a preceding symbol is obtained according to the channel estimation results determined according to the scattered pilot signals of the preceding symbol and the current symbol. Since pilot signals are scattered in scattered pilot signal subchannels, the linear interpolation mentioned in the first part consumes a lot of memory space and thus causes delay during making decision. Additionally, when a subchannel requires strict frequency selection, a filter with more taps is needed to get accurate interpolation results during the second part of the channel estimation process.

SUMMARY OF INVENTION

It is an objective of the present invention to provide an adaptive channel estimation method utilized in a multicarrier communication system.

According to an embodiment of the present invention, an adaptive channel estimation method utilized in a multicarrier communication system is disclosed. The multicarrier communication system transmits a symbol through a plurality of subchannels. The plurality of subchannels includes a plurality of pilot signal subchannels and a plurality of data signal subchannels. The pilot signal subchannels transmit a plurality of pilot signals of the symbol; the data signal subchannels transmit a plurality of data signals of the symbol. Each of the pilot signal subchannels is a continual pilot signal subchannel or a scattered pilot signal subchannel; each of the data signal subchannels is a scattered pilot signal subchannel or a simple data signal subchannel. The method includes: categorizing each of the subchannels according to the relative position of each of the subchannels with respect to at least one of the pilot signal subchannels; determining channel response(s) of at least one of the pilot signal subchannels; determining a first set of interpolation coefficients according to the channel response(s) of at least one of the pilot signal subchannels; estimating channel response(s) of at least one of the data signal subchannels among the scattered pilot signal subchannels according to the first set of interpolation coefficients and channel response(s) of at least one of the pilot signal subchannels; and according to already determined channel response(s) of at least one of the pilot signal subchannels, determining a second set of interpolation coefficients and estimating channel responses of the simple data signal subchannels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
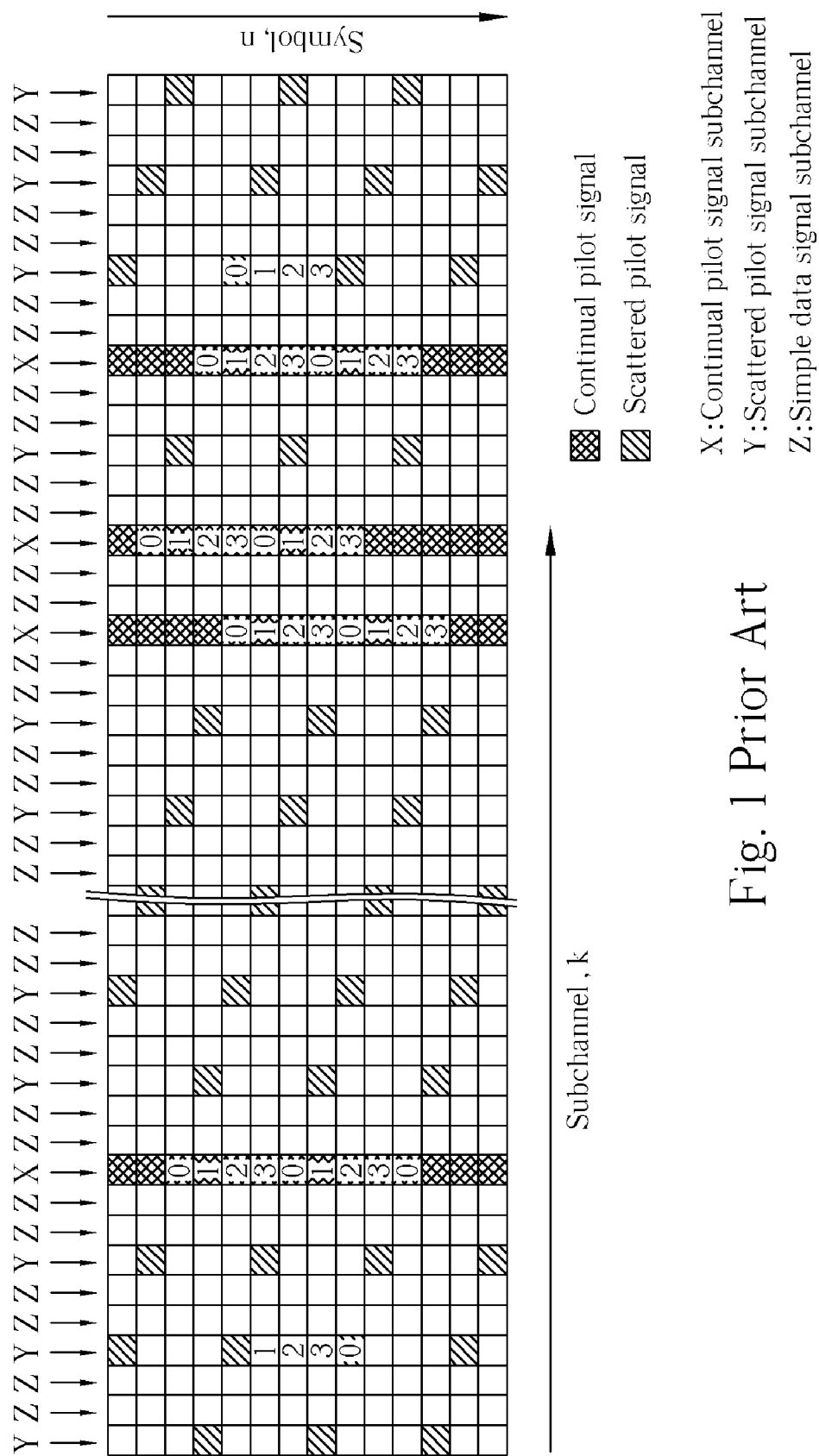
FIG. 1 is a diagram illustrating how pilot signals are allocated in a few symbols according to the DVB-T standard.
Figure 2:
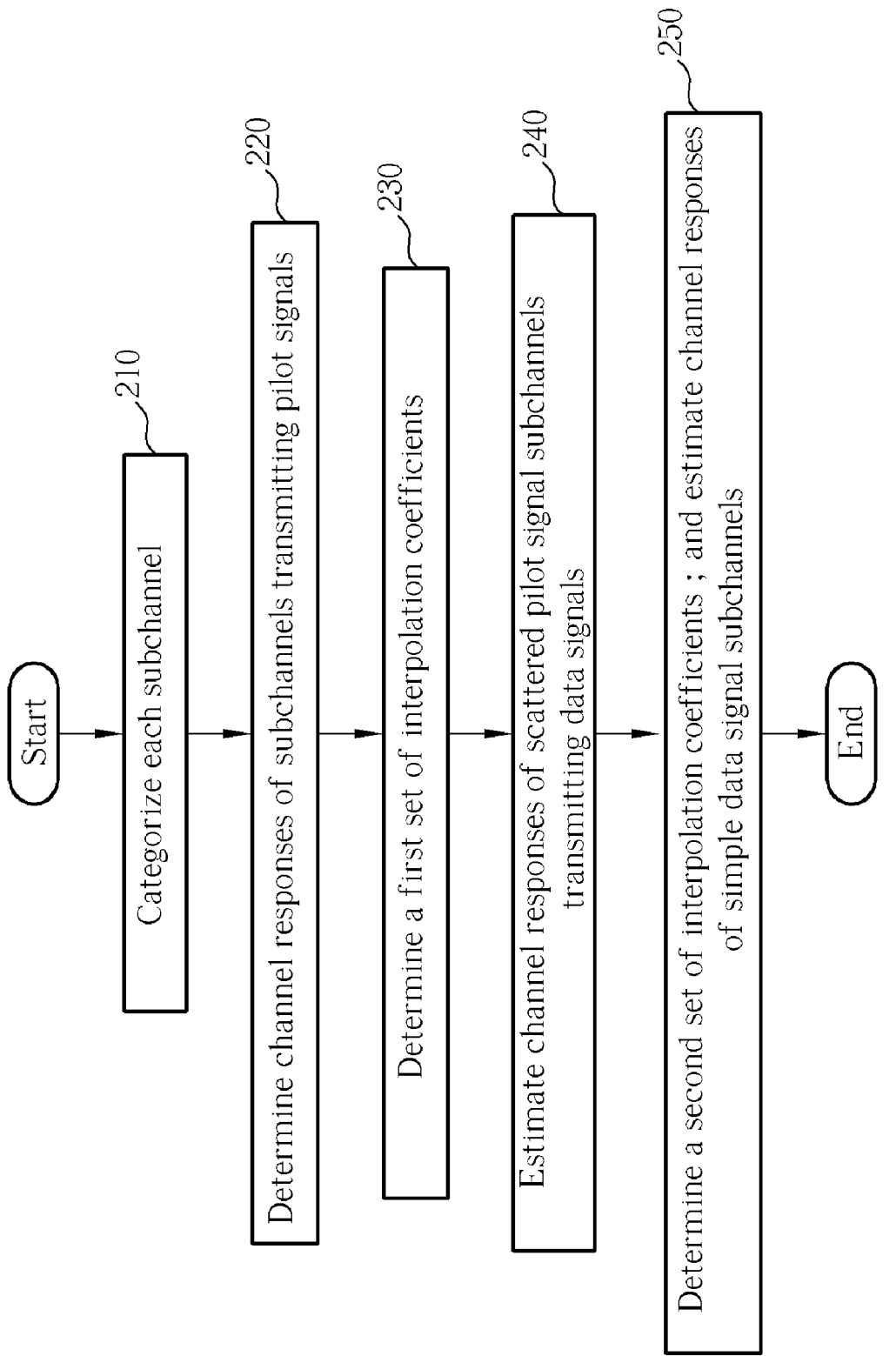
FIG. 2 is a flowchart of an adaptive channel estimation method according to an embodiment of the present invention.

FIG. 2 is a flowchart of the adaptive channel estimation method according to an embodiment of the present invention. In the following paragraphs, the DVB-T standard is used as an example to help thoroughly explain the flowchart of FIG. 2.

Please note that the method of the present invention is not limited to the DVB-T standard.

According to the DVB-T standard, the subchannels can be categorized into two types, which are type_1 subchannels and type_2 subchannels. A type_1 subchannel is dedicated for transmitting pilot signals. Therefore, a type_1 subchannel is either a continual pilot signal subchannel or a scattered pilot signal subchannel. According to the present embodiment, a type_1 subchannel is further classified as class_0, 1, 2, and 3 according to the outcome of ((n+k) mod 4), wherein n is the number of a symbol; k is the number of a subchannel; and mod means modulus function. A type_2 subchannel is a subchannel dedicated for transmitting data signals. Thus, a type_2 subchannel is always a simple data signal subchannel. According to the present embodiment, a type_2 subchannel is further classified as class_4 and class_5 according to the outcome of (k mod 3).

The steps shown in the flowchart are described as follows:

Step 210: Categorize each subchannel according to its relative position with respect to one or more subchannels transmitting pilot signals.

Step 220: Determine channel responses of subchannels transmitting pilot signals according to continual or/and scattered pilot signals.

Step 230: Determine a first set of interpolation coefficients according to different types of subchannels transmitting pilot signals and channel responses of corresponding subchannels transmitting pilot signals.

Step 240: Estimate channel responses of scattered pilot signal subchannels transmitting data signals according to the first set of interpolation coefficients and channel responses of subchannel transmitting pilot signals.

Step 250: Determine a second set of interpolation coefficients according to channel responses of continual and scattered pilot signal subchannels. Then estimate channel responses of simple data signal subchannels.

Figure 3:
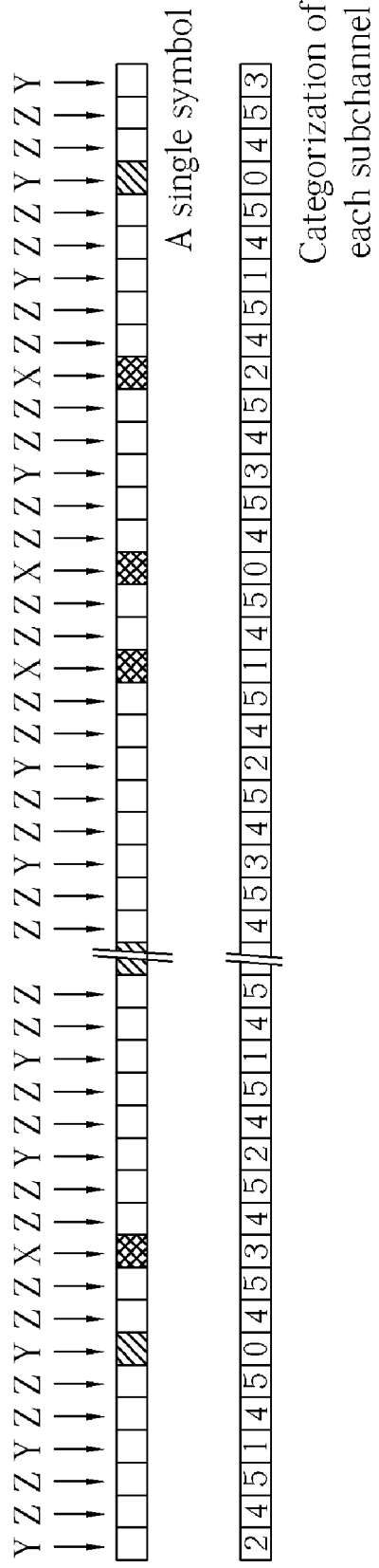
FIG. 3 is a diagram illustrating how subchannels of a single symbol of DVB-T standard are categorized.

Please refer to FIG. 3, which shows an example illustrating how subchannels of a single symbol of the DVB-T standard are categorized. Take the DVB-T standard for example. The categorizing results of step 210 are as follows:

Class_0: When ((n+k) mod 4)=0, the $k^{th}$ subchannel itself transmits a pilot signal.

Class_1: When ((n+k) mod 4)=1, both the $(k+3)^{th}$ subchannel and the $(k-9)^{th}$ subchannel transmit pilot signals.

Class_2: When ((n+k) mod 4)=2, both the $(k+6)^{th}$ subchannel and the $(k-6)^{th}$ subchannel transmit pilot signals.

Class_3: When ((n+k) mod 4)=3, both the $(k+9)^{th}$ subchannel and the $(k-3)^{th}$ subchannel transmit pilot signals.

Class_4: When (k mod 3)=1, the $(k-1)^{th}$ subchannel and the $(k+2)^{th}$ subchannel are continual or scattered pilot signal subchannels.

Class_5: When (k mod 3)=2, the $(k-2)^{th}$ subchannel and the $(k+1)^{th}$ subchannel are continual or scattered pilot signal subchannels.

Please note that for each symbol of the DVB-T standard, there are class_0 through class_3 subchannels transmitting continual pilot signals, class_0 subchannels transmitting scattered pilot signals, class_1 through class_3 subchannels transmitting data signals, and class_4 through class_5 subchannels transmitting data signals.

In step 220, channel responses of subchannels transmitting pilot signals are determined according to received continual or scattered pilot signals. Hence, channel responses of class_0 through class_3 subchannels transmitting continual pilot signals and class_0 subchannels transmitting scattered pilot signals are determined.

In step 230, a first set of interpolation coefficients is determined by interpolation according to the channel responses of a plurality of subchannels transmitting pilot signals and the types of said subchannels. In this embodiment, a 3-tap filter can be utilized for interpolation. The equations for determining interpolation coefficients are as follows:

$$\text{Class\_1:}\ \hat{H}(n,k)=c_{11}\cdot\hat{H}(n-1,k)+c_{12}\cdot\hat{H}(n,k+3)+c_{13}\cdot\hat{H}(n,k-9) \quad (1)$$

$$\text{Class\_2:}\ \hat{H}(n,k)=c_{21}\cdot\hat{H}(n-1,k)+c_{22}\cdot\hat{H}(n,k+6)+c_{23}\cdot\hat{H}(n,k-6) \quad (2)$$

$$\text{Class\_3:}\ \hat{H}(n,k)=c_{31}\cdot\hat{H}(n-1,k)+c_{32}\cdot\hat{H}(n,k+9)+c_{33}\cdot\hat{H}(n,k-3) \quad (3)$$

Figure 4:
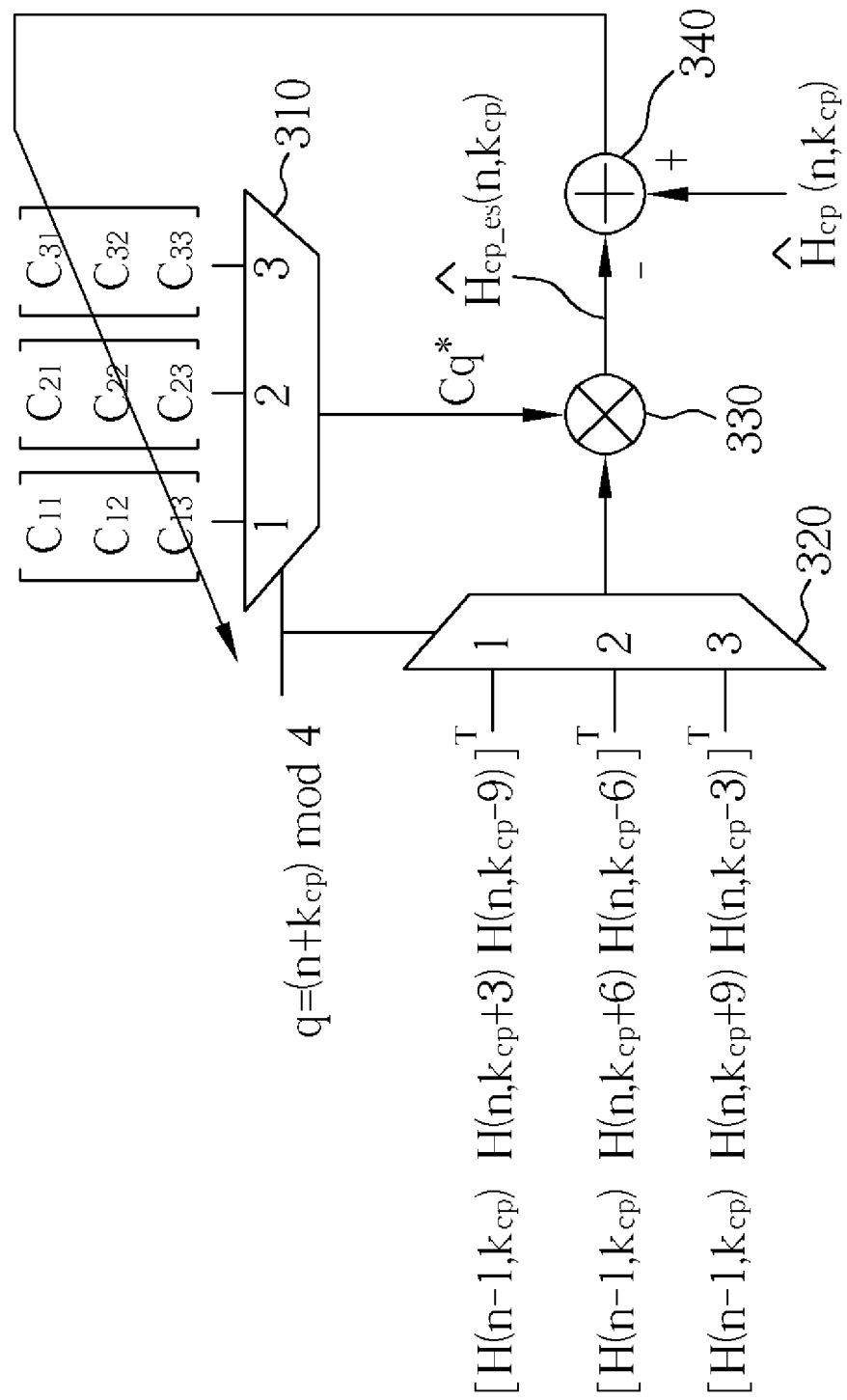
FIG. 4 is a block diagram of an apparatus utilized for training the first set of interpolation coefficients.

In the above mentioned equations, $\hat{H}(n,k)$ and $\hat{H}(n-1,k)$ are channel responses of continual pilot signal subchannels, and $\hat{H}(n,k-3)$, $\hat{H}(n,k+3)$, $\hat{H}(n,k-6)$, $\hat{H}(n,k+6)$, $\hat{H}(n,k-9)$, and $\hat{H}(n,k+9)$ are channel responses of scattered pilot signal subchannels corresponding to different classes. These channel responses are already determined in step 220 and thereby the filter can be trained, so as to obtain the first set of interpolation coefficients $c_{ij}$ (i=1,2,3, j=1,2,3). FIG. 4 shows an apparatus for executing training process. More specifically, channel responses of continual pilot signal subchannels and the other pilot signal subchannels are respectively set on the left and right sides of the equal signs in equations (1), (2), and (3). Furthermore, the first set of interpolation coefficients $c_{ij}$ (i=1,2,3, j=1,2,3) are adjusted until the estimated channel response $\hat{H}_{cp\_es}(n,k_{cp})$ closes to or substantially equals the actual channel response, $\hat{H}_{cp}(n,k_{cp})$, of the continual pilot signal subchannel.

Please note that the term $\hat{H}(n-1,k)$ may be neglected in equations (1), (2), or (3). Without the term $\hat{H}(n-1,k)$, channel responses of all subchannels can be determined according to pilot signals of one symbol.

In step 240, channel responses of class_1 through class_3 subchannels transmitting data signals are estimated through interpolation according to channel responses of subchannels transmitting pilot signals. The estimating process of this step can be also achieved through equations (1), (2), and (3), while the first set of interpolation coefficients $c_{ij}$ (i=1,2,3, j=1,2,3) are fix values because these values are already trained. Channel responses $\hat{H}(n,k)$ of of class_1 through class_3 subchannels transmitting data signals are then determined.

After step 240, only channel responses of class_4 and class_5 subchannels remain unknown. Step 250 is for determining these channel responses through interpolation according to the estimated channel responses. The present invention can utilize, but is not limited to, a 2-tap filter for executing step 250. The equations for interpolation are shown as follows:

$$\text{Class\_4:}\ \hat{H}(n,k)=\omega^{*}_{11}\cdot\hat{H}(n,k-1)+\omega^{*}_{12}\cdot\hat{H}(n,k+2) \quad (4)$$

$$\text{Class\_5:}\ \hat{H}(n,k)=\omega^{*}_{21}\cdot\hat{H}(n,k-2)+\omega^{*}_{22}\cdot\hat{H}(n,k+1) \quad (5)$$

Figure 5:
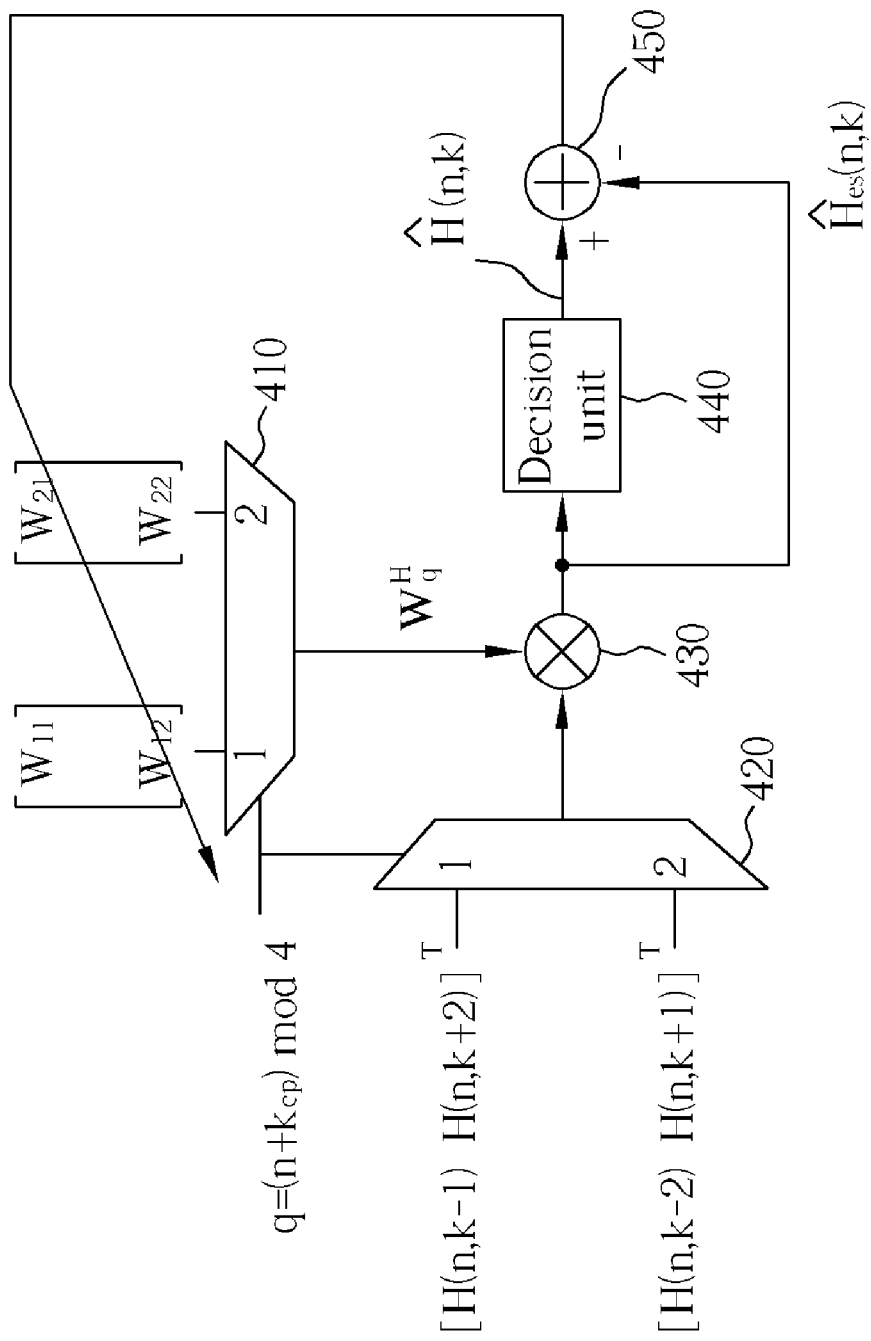
FIG. 5 is a block diagram of an apparatus utilized for training the second set of interpolation coefficients.

In the embodiment of the present invention, an adaptive decision-directed algorithm is utilized in step 250 for training a second set of interpolation coefficients $\omega_{ij}$ (i=1,2, j=1,2). FIG. 5 shows an apparatus for executing training process of step 250. More specifically, channel response $\hat{H}_{es}(n,k)$ estimated based on the second set of interpolation coefficients $\omega_{ij}$ (i=1,2, j=1,2) is compared with ideal channel responses $\hat{H}(n,k)$ generated by the decision unit 440 of FIG. 5. The second set of interpolation coefficients $\omega_{ij}$ (i=1,2, j=1,2) are adjusted according to the comparing results until $\hat{H}_{es}(n,k)$ closes to or substantially equals to $\hat{H}(n,k)$. The adjusted (i.e. trained) second set of interpolation coefficients $\omega_{ij}$ (i=1,2, j=1,2) is then utilized for subsequent interpolation processes. Please refer to the following paper for more information about the adaptive decision-directed algorithm: "Channel Estmation Units for an OFDM System Suitable for Mobile Communication", F. Classen, M. Speth, H. Meyr, in Mobile Kommunikation: ITG-Fachbericht. Munchen, Germany: ITG, VDE-Verlag, Berlin Offenbach, September 1995.

Besides, since adaptive channel estimation is utilized in the present invention, the interpolation coefficient corresponding to each subchannel can be dynamically adjusted (e.g., based on a signal to noise ratio SNR) to improve the stability of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive channel estimation method utilized in a multicarrier communication system, the multicarrier communication system transmitting a symbol through a plurality of subchannels, the plurality of subchannels comprising a plurality of pilot signal subchannels and a plurality of data signal subchannels, the pilot signal subchannels transmitting a plurality of pilot signals of the symbol, the data signal subchannels transmitting a plurality of data signals of the symbol, each of the pilot signal subchannels being a continual pilot signal subchannel or a scattered pilot signal subchannel, each of the data signal subchannels being the scattered pilot signal subchannel or a simple data signal subchannel, the continual pilot signal subchannel only used for transmitting pilot signals, the scattered pilot signal subchannel used for transmitting at least one of pilot signals and data signals, and the simple data signal subchannel only used for transmitting data signals, the method comprising:

categorizing each of the subchannels according to a relative position of each of the subchannels with respect to at least one of the pilot signal subchannels, the categorizing step comprising a step of categorizing the subchannels according to a result of ((n+k) mod 4) and a result of (k mod 3), wherein n is the number of the symbol, k is the number of one of the subchannels, and mod represents modulus function;

determining channel response(s) of one or more of the pilot signal subchannels;

determining a first set of interpolation coefficients according to the categorizing step and the channel response(s) of the one or more of the pilot signal subchannels;

estimating channel response(s) of at least one of the scattered pilot signal subchannels according to the first set of interpolation coefficients and the channel response(s) of the one or more of the pilot signal subchannels; and according to the already determined channel responses of the subchannels, determining a second set of interpolation coefficients and estimating channel response(s) of at least one of the simple data signal subchannels.

2. The method of claim 1, wherein the step of categorizing each of the subchannels comprises:

if a $k^{th}$ subchannel is a continual pilot signal subchannel or a scattered pilot signal subchannel:
categorizing the $k^{th}$ subchannel as a class_1 subchannel if both a $(k+3)^{th}$ subchannel and a $(k-9)^{th}$ subchannel transmit pilot signals;
categorizing the $k^{th}$ subchannel as a class_2 subchannel if both a $(k+6)^{th}$ subchannel and a $(k-6)^{th}$ subchannel transmit pilot signals; and
categorizing the $k^{th}$ subchannel as a class_3 subchannel if both a $(k+9)^{th}$ subchannel and a $(k-3)^{th}$ subchannel transmit pilot signals; and if the $k^{th}$ subchannel is a simple data signal subchannel:
categorizing the $k^{th}$ subchannel as a class_4 subchannel if a $(k-1)^{th}$ subchannel and a $(k+2)^{th}$ subchannel are continual or scattered pilot signal subchannels; and
categorizing the $k^{th}$ subchannel as a class_5 subchannel if a $(k-2)^{th}$ subchannel and a $(k+1)^{th}$ subchannel are continual or scattered pilot signal subchannels.

3. The method of claim 2, wherein the method utilizes a linear interpolation algorithm to generate the first set of interpolation coefficients.

4. The method of claim 3, wherein the method determines the first set of interpolation coefficients according to the following equations:

for class_1 subchannels:

$$\hat{H}(n,k)=c_{11}*\hat{H}(n-1,k)+c_{12}*\hat{H}(n,k+3)+c_{13}*\hat{H}(n,k-9);$$

for class_2 subchannels:

$$\hat{H}(n,k)=c_{21}*\hat{H}(n-1,k)+c_{22}*\hat{H}(n,k+6)+c_{23}*\hat{H}(n,k-6);$$

for class_3 subchannels:

$$\hat{H}(n,k)=c_{31}*\hat{H}(n-1,k)+c_{32}*\hat{H}(n,k+9)+c_{33}*\hat{H}(n,k-3);$$

wherein, $\hat{H}(n,k)$, $\hat{H}(n-1,k)$, $\hat{H}(n,k-3)$, $\hat{H}(n,k+3)$, $\hat{H}(n,k-6)$, $\hat{H}(n,k+6)$, $\hat{H}(n,k-9)$, and $\hat{H}(n,k+9)$ are channel responses of the pilot signal subchannels, and $c_{ij}$ (i=1,2,3, j=1,2,3) are the first set of interpolation coefficients.

5. The method of claim 4, wherein the step of determining the first set of interpolation coefficients further comprises:

interpolating at least one estimated channel response with the first set of interpolation coefficients and channel response(s) of at least one of the pilot signal subchannels; and adjusting the first set of interpolation coefficients according to the at least one estimated channel response and at least one actual channel response.

6. The method of claim 2, wherein the step of estimating channel response(s) of the at least one of the scattered pilot signal subchannels transmitting data signals further comprises:

if the scattered pilot signal subchannel is a class_1 subchannel, estimating the channel response of the scattered pilot signal subchannel according to the following equation:

$$\hat{H}(n,k)=c_{11}*\hat{H}(n-1,k)+c_{12}*\hat{H}(n,k+3)+c_{13}*\hat{H}(n,k-9);$$

if the scattered pilot signal subchannel is a class_2 subchannel, estimating the channel response of the scattered pilot signal subchannel according to the following equation:

$$\hat{H}(n,k)=c_{21}*\hat{H}(n-1,k)+c_{22}*\hat{H}(n,k+6)+c_{23}*\hat{H}(n,k-6);$$
and if the scattered pilot signal subchannel is a class_3 subchannel, estimating the channel response of the scattered pilot signal subchannel according to the following equation:

$$\hat{H}(n,k)=c_{31}*\hat{H}(n-1,k)+c_{32}*\hat{H}(n,k+9)+c_{33}*\hat{H}(n,k-3);$$

wherein, $\hat{H}(n-1,k)$, $\hat{H}(n,k-3)$, $\hat{H}(n,k+3)$, $\hat{H}(n,k-6)$, $\hat{H}(n,k+6)$, $\hat{H}(n,k-9)$, and $\hat{H}(n,k+9)$ are channel responses of the pilot signal subchannels, $c_{ij}$ (i=1,2,3, j=1,2,3) are the first set of interpolation coefficients, and $\hat{H}(n,k)$ is the channel response of the scattered pilot signal subchannel transmitting the data signal.

7. The method of claim 1, wherein the method utilizes an adaptive decision-oriented algorithm to estimate channel response(s) of the at least one of the simple data signal subchannels.

8. The method of claim 1, wherein the multicarrier communication system is in accordance with a DVB-T standard.

9. An adaptive channel estimation method utilized in a multicarrier communication system, the multicarrier communication system transmitting a symbol through a plurality of subchannels, the plurality of subchannels comprising a plurality of pilot signal subchannels and a plurality of data signal subchannels, the pilot signal subchannels transmitting a plurality of pilot signals of the symbol, the data signal subchannels transmitting a plurality of data signals of the symbol, the method comprising:
  categorizing each of the subchannels according to a relative position of each of the subchannels with respect to at least one of the pilot signal subchannels and thereby determining a type of each of the subchannels, the categorizing step comprising a step of categorizing the subchannels according to a result of ((n+k) mod 4) and a result of (k mod 3), wherein n is the number of the symbol, k is the number of one of the subchannels, and mod represents modulus function;
  determining channel response(s) of one or more of the pilot signal subchannels with respect to their types; and
  estimating channel responses of the data signal subchannels according to the channel response(s) of the one or more of the pilot signal subchannels.

10. The method of claim 9, wherein each of the pilot signal subchannels is a continual pilot signal subchannel or a scattered pilot signal subchannel, each of the data signal subchannels is a scattered pilot signal subchannel or a simple data signal subchannel, the continual pilot signal subchannel transmits pilot signals, the scattered pilot signal subchannel transmits at least one of pilot signals and data signals, and the simple data signal subchannel transmits data signals.

11. The method of claim 10, wherein the step of categorizing each of the subchannels comprises:
  if a $k^{th}$ subchannel is a continual pilot signal subchannel or a scattered pilot signal subchannel:
    categorizing the $k^{th}$ subchannel as a class_1 subchannel if both a $(k+3)^{th}$ subchannel and a $(k-9)^{th}$ subchannel transmit pilot signals;
    categorizing the $k^{th}$ subchannel as a class_2 subchannel if both a $(k+6)^{th}$ subchannel and a $(k-6)^{th}$ subchannel transmit pilot signals; and
    categorizing the $k^{th}$ subchannel as a class_3 subchannel if both a $(k+9)^{th}$ subchannel and a $(k-3)^{th}$ subchannel transmit pilot signals; and
  if the $k^{th}$ subchannel is a simple data signal subchannel:
    categorizing the $k^{th}$ subchannel as a class_4 subchannel if a $(k-1)^{th}$ subchannel and a $(k+2)^{th}$ subchannel are continual or scattered pilot signal subchannels; and
    categorizing the $k^{th}$ subchannel as a class_5 subchannel if a $(k-2)^{th}$ subchannel and a $(k+1)^{th}$ subchannel are continual or scattered pilot signal subchannels.

12. The method of claim 9, wherein the method utilizes a linear interpolation algorithm to estimate channel responses of the data signal subchannels.

13. The method of claim 9, wherein the method utilizes an adaptive decision-oriented algorithm to estimate channel responses of the data signal subchannels.

14. The method of claim 9, wherein the multicarrier communication system is in accordance with a DVB-T standard.

15. An adaptive channel estimation method utilized in a multicarrier communication system, the multicarrier communication system transmitting a symbol through a plurality of subchannels, the plurality of subchannels comprising a plurality of pilot signal subchannels and a plurality of data signal subchannels, the pilot signal subchannels transmitting a plurality of pilot signals of the symbol, the data signal subchannels transmitting a plurality of data signals of the symbol, the method comprising:
  categorizing each of the subchannels according to a relative position of each of the subchannels with respect to at least one of the pilot signal subchannels, the categorizing step comprising:
    if a $k^{th}$ subchannel is a continual pilot signal subchannel or a scattered pilot signal subchannel:
      categorizing the $k^{th}$ subchannel as a class_1 subchannel if both a $(k+3)^{th}$ subchannel and a $(k-9)^{th}$ subchannel transmit pilot signals;
      categorizing the $k^{th}$ subchannel as a class_2 subchannel if both a $(k+6)^{th}$ subchannel and a $(k-6)^{th}$ subchannel transmit pilot signals; and
      categorizing the $k^{th}$ subchannel as a class_3 subchannel if both a $(k+9)^{th}$ subchannel and a $(k-3)^{th}$ subchannel transmit pilot signals; and
    if the $k^{th}$ subchannel is a simple data signal subchannel:
      categorizing the $k^{th}$ subchannel as a class_4 subchannel if a $(k-1)^{th}$ subchannel and a $(k+2)^{th}$ subchannel are continual or scattered pilot signal subchannels; and
      categorizing the $k^{th}$ subchannel as a class_5 subchannel if a $(k-2)^{th}$ subchannel and a $(k+1)^{th}$ subchannel are continual or scattered pilot signal subchannels;
  determining channel response(s) of one or more of the class_1 through class_3 subchannels; and
  estimating channel responses of the data signal subchannels according to the channel response(s) of the one or more of the class_1 through class_3 subchannels.

* * * * *